United States Patent
Morishita et al.

(10) Patent No.: US 10,438,441 B2
(45) Date of Patent: Oct. 8, 2019

(54) TERMINAL DEVICE AND SERVER DEVICE PROVIDING GAME, AND METHOD PROVIDING GAME

(71) Applicant: GungHo Online Entertainment, Inc., Tokyo (JP)

(72) Inventors: Kazuki Morishita, Tokyo (JP); Daisuke Yamamoto, Tokyo (JP); Kenji Kobayashi, Tokyo (JP); Koichi Nobori, Tokyo (JP); Tomoyuki Morishita, Tokyo (JP); Hajime Miyajima, Tokyo (JP); Atsuo Kamiya, Tokyo (JP); Satoru Obana, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 613 days.

(21) Appl. No.: 15/183,277

(22) Filed: Jun. 15, 2016

(65) Prior Publication Data

US 2017/0243435 A1   Aug. 24, 2017

Related U.S. Application Data

(63) Continuation of application No. PCT/JP2016/054669, filed on Feb. 18, 2016.

(51) Int. Cl.
*G06F 17/00* (2019.01)
*G07F 17/32* (2006.01)
(Continued)

(52) U.S. Cl.
CPC ........ *G07F 17/3225* (2013.01); *A63F 13/216* (2014.09); *A63F 13/69* (2014.09); *G07F 17/3211* (2013.01); *G07F 17/3274* (2013.01)

(58) Field of Classification Search
CPC ............. G07F 17/3225; G07F 17/3211; A63F 13/216; A63F 13/69
See application file for complete search history.

(56) References Cited

U.S. PATENT DOCUMENTS

| | | | |
|---|---|---|---|
| 9,604,131 B1 * | 3/2017 | Kiyohara | A63F 13/00 |
| 2010/0227669 A1 * | 9/2010 | Van Luchene | A63F 13/12 463/23 |

(Continued)

FOREIGN PATENT DOCUMENTS

| | | |
|---|---|---|
| JP | 2012-151735 A | 8/2012 |
| JP | 2013-146477 A | 8/2013 |
| JP | 2013-192761 A | 9/2013 |

OTHER PUBLICATIONS

Puzzle & Dragons. Wikipedia.org. Online. Feb. 17, 2015. Accessed via the Internet. Accessed Dec. 18, 2018. <URL: https://web.archive.org/web/20150217231036/https://en.wikipedia.org/wiki/Puzzle_%26_Dragons> (Year: 2015).*

(Continued)

*Primary Examiner* — Dmitry Suhol
*Assistant Examiner* — Carl V Larsen
(74) *Attorney, Agent, or Firm* — Harness, Dickey & Pierce, P.L.C.

(57) ABSTRACT

A service device provides a multiplayer game which a user can enjoy by a new technique. The server device includes a storage unit for storing information on at least one predetermined team operated by a predetermined player corresponding to a terminal device and made up of a plurality of characters; a first control unit for transmitting to the terminal device information on other players corresponding to other terminal devices located within a predetermined distance from the location of the terminal device; and a second control unit for controlling a game between the at least one predetermined team and an opponent character, and trans- (Continued)

| PEOPLE NEARBY | | |
|---|---|---|
| 1 | X12356 | PROTECTION OFF |
| 2 | Y22313 | PROTECTION ON |
| 3 | Q23521 | PROTECTION OFF |
| 4 | R11121 | PROTECTION OFF |
| 5 | Z45454 | PROTECTION OFF |

60

UPDATE mitting information on a specified character selected from among a plurality of characters constituting at least one other team operated by the other players to the terminal device as a candidate for an additional character to be added to the at least one predetermined team.

9 Claims, 9 Drawing Sheets

(51) Int. Cl.
*A63F 13/69* (2014.01)
*A63F 13/216* (2014.01)

(56) References Cited

U.S. PATENT DOCUMENTS

| | | | | |
|---|---|---|---|---|
| 2012/0046093 | A1* | 2/2012 | Yamaguchi | A63F 13/69 463/23 |
| 2013/0196773 | A1* | 8/2013 | Lockeby | H04W 4/023 463/42 |
| 2015/0024783 | A1* | 1/2015 | Konno | A63F 13/30 455/456.3 |
| 2015/0050995 | A1* | 2/2015 | Nelson | A63F 13/79 463/31 |
| 2015/0165325 | A1* | 6/2015 | Yamamura | A63F 13/58 463/42 |
| 2016/0086453 | A1* | 3/2016 | Cage | A63F 13/213 463/29 |
| 2016/0092923 | A1* | 3/2016 | Grenier | G06F 16/9537 705/14.36 |

OTHER PUBLICATIONS

Game Mechanics. Pad.wikia.com. Online. Feb. 10, 2015. Accessed via the Internet. Acessed Dec. 18, 2018. <URL: https://web.archive.org/web/20150210202445/http://pad.wikia.com/wiki/Game_Mechanics> (Year: 2015).*

Katkoff, Michail. How Puzzle & Dragons Does It. Gamasutra.com. Online. Feb. 25, 2013. Accessed via the Internet. Accessed Dec. 18, 2018. <URL: https://www.gamasutra.com/blogs/MichailKatkoff/20130225/187247/How_Puzzle_Dragons_Does_It.php> (Year: 2013).*

Sage, Simon. Puzzle & Dragons: Top five tips, tricks and cheats for dungeon dominance. imore.com. Online. Mar. 15, 2014. Accessed via the Internet. Accessed Dec. 18, 2018. <URL: https://www.imore.com/puzzle-dragons-top-five-tips-tricks-and-cheats-dungeon-dominance> (Year: 2014).*

PS Vita Near Tip. Youtube.com. Online. Mar. 5, 2012. Accessed via the Internet. Accessed Dec. 18, 2018. <URL: https://www.youtube.com/watch?v=oJcIVcXBFx0> (Year: 2012).*

Studio-M Corporation Ltd., "Mystery Dungeon, Shiren the Wanderer, The Eye of God and the Devil's Navel", Complete official guide first edition, Enterbrain, May 11, 2010, pp. 92-93.

* cited by examiner

| SELECTION OF MONSTER | |
|---|---|
| 1 | MONSTER A (RED) |
| 2 | MONSTER B (BLUE) |
| 3 | MONSTER C (GREEN) |
| 4 | MONSTER D (RED) |
| 5 | MONSTER E (BLUE) |

FIG. 10

| | SELECTION OF HELPER | |
|---|---|---|
| 1 | | MR/MS K |
| 2 | | MR/MS L |
| 3 | | MR/MS M |
| 4 | | MR/MS N |
| 5 | | MR/MS O |

TERMINAL DEVICE AND SERVER DEVICE PROVIDING GAME, AND METHOD PROVIDING GAME

This application is a continuation of International application No. PCT/JP2016/054669, filed Feb. 18, 2016, entitled "TERMINAL DEVICE AND SERVER DEVICE PROVIDING GAME, AND METHOD PROVIDING GAME", which is hereby expressly incorporated by reference herein in its entirety.

FIELD

The disclosed technology in the specification relates to a terminal device and a server device providing a game, and a method for providing a game.

BACKGROUND

Over the past several years there have been provided online games that users can enjoy using a terminal device connected to the Internet. With such online games, as disclosed by Japanese Unexamined Patent Publication No. 2013-192761 (hereinafter "Patent Document 1"), a service is known in which a user can interact with another user, upon becoming friends therewith, when a terminal device of the other user is detected located within a predetermined range from the current location of the terminal device of the user. The entire contents of Patent Document 1 are hereby incorporated herein by reference.

Online games extensively provide multiplayer games of the type involving a contest against an opponent character by a predetermined team operated by a predetermined user and made up of a plurality of characters. New techniques to generate user enjoyment are constantly required for such multiplayer games.

SUMMARY

Accordingly, various embodiments provide multiplayer games which a user can enjoy via new techniques.

A server device according to one aspect of the present invention comprises: a storage unit for storing information on at least one predetermined team operated by a predetermined player corresponding to a terminal device and made up of a plurality of characters; a first control unit for transmitting to the terminal device information on at least one other player corresponding to at least one other terminal device located within a predetermined distance from the location of the terminal device; and a second control unit for controlling a game played by the at least one predetermined team against an opponent character, said second control unit transmitting to the terminal device information on specified characters selected from among a plurality of characters forming at least one other team operated by the at least one other player as candidates for an additional character to be added to the at least one predetermined team.

A terminal device according to one aspect of the present invention comprises: a storage unit for storing information on at least one local team operated by a local player corresponding to the terminal device and made up of a plurality of characters; a receiver for receiving, via a communication line, information on at least one other player corresponding to at least one other terminal device located within a predetermined distance from the location of the terminal device; and a game playing unit for playing a game between the at least one local team and an opponent character, the game playing unit being capable of displaying specified characters selected from among a plurality of characters forming at least one other team operated by the at least one other player as candidates for an additional character to be added to the at least one local team.

A method according to one aspect of the present invention comprises: a server device storing information on at least one predetermined team operated by a predetermined player corresponding to a terminal device and made up of a plurality of characters; the server device transmitting to the terminal device, via a communication line, information on at least one other player corresponding to at least one other terminal device located within a predetermined distance from the location of the terminal device; and the terminal device playing a game between the at least one predetermined team and an opponent character, and displaying specified characters selected from among a plurality of characters forming at least one other team operated by the at least one other player as candidates for an additional character to be added to the at least one predetermined team.

A non-transitory computer-readable medium storing a computer program product according to one aspect of the present invention is configured to allow a computer to operate as: a storage unit for storing information on at least one local team operated by a local player corresponding to the terminal device and made up of a plurality of characters; a receiver for receiving, via a communication line, information on at least one other player corresponding to at least one other terminal device located within a predetermined distance from the location of the terminal device; and a game playing unit for playing a game between the at least one local team and an opponent character, the game playing unit being capable of displaying specified characters selected from among a plurality of characters forming at least one other team operated by the at least one other player as candidates for an additional character to be added to the at least one local team.

DETAILED DESCRIPTION

Various embodiments of the present invention will be described hereinafter with reference to the appended drawings. Shared components are labeled in the drawings by the same reference numerals.

First, as a typical embodiment, an embodiment will be described in which a terminal device starts up a first application to provide a service for acquiring information on other players corresponding to other terminal devices located within a predetermined distance from the location of the terminal device (hereafter called "service providing information on other players"), and starts up a second application to provide a service for playing a multiplayer game (hereafter called "multiplayer game service"). The terminal device, however, may start up one or a plurality of shared applications to provide both the "service providing information on other players" and the "multiplayer game service." Instead of or in addition to this, the terminal device may provide at least one service from among the "service providing information on other players" and the "multiplayer game service" by a mode of receiving a webpage from a server device.

1. Outline of Game System

Figure 1A:
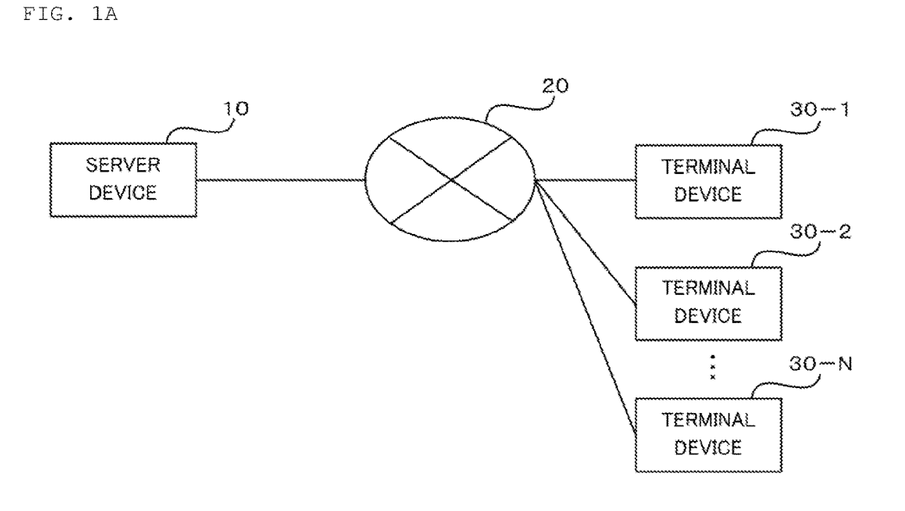
FIG. 1A is a Schematic block diagram showing a game system according to an embodiment of the present invention.

FIG. 1A is a schematic block diagram showing a game system according to an embodiment of the present invention. As shown in FIG. 1A, a server device 10 for an online game according to an embodiment of the present invention (hereafter simply called "server device 10") is connected through a communication network 20 such as the Internet to, and capable of communicating with, a plurality of terminal devices 30-1, 30-2, . . . , 30-N (hereafter collectively called "terminal device 30") provided with a communication function. The server device 10 is an example of a device for implementing part or all of a game system according to an embodiment of the present invention.

2. Configuration of Server Device 10

Figure 1B:
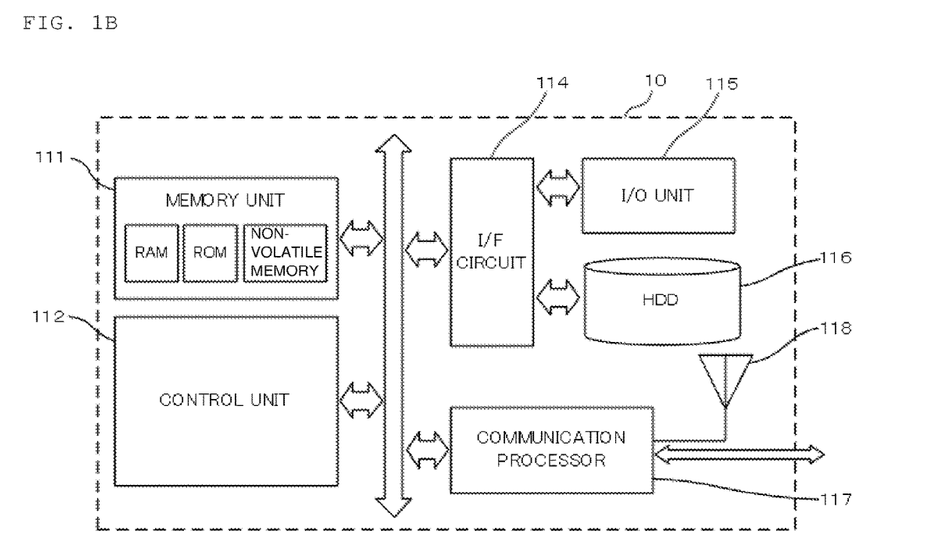
FIG. 1B is a Block diagram showing an example of the configuration of the server device 10 according to an embodiment of the present invention.

FIG. 1B is a block diagram showing an example of the configuration of a server device 10 according to an embodiment of the present invention. The server device 10 need not be provided with all of the components shown in FIG. 1B, and may comprise a configuration omitting some of these components or having other additional components.

According to FIG. 1B, a server device 100 comprises a storage unit 111 including a RAM, a ROM, and a nonvolatile memory, a control unit 112 comprising a CPU and the like, an I/F circuit 114 for connecting to an I/O unit 115 and an HDD 116, and a communication unit comprising a communication processor 117 and an antenna 118. These components are electrically interconnected through control lines and data lines.

The storage unit 111 includes a RAM, a ROM, and a nonvolatile memory. The storage unit 111 stores various programs for implementing a system 1 in the server device 100 (for example, a program providing a "service for providing information on other players" and a "multiplayer game service") and a system capable of executing these programs. These programs and systems are loaded and executed by the control unit 112. The storage unit (especially the RAM) is used temporarily for writing and reading data while the control unit 112 executes the programs.

The control unit 112 comprises a central processing unit (CPU), and controls other connected components on the basis of the various programs stored in the storage unit 111. For example, the control unit 112 refers to the information stored in the storage unit 111 to generate information on other players corresponding to other terminal devices located within a predetermined distance from the location of a predetermined terminal device corresponding to a predetermined player, and exercises control so as to transmit this information to the predetermined terminal device. The control unit 112 also refers to the information stored in the storage unit 111 to exercise control pertaining to playing a game against an opponent character by at least one predetermined team operated by a predetermined user and made up of a plurality of characters, and exercises control so as to transmit to the terminal device the information on a specified character selected from among a plurality of characters constituting at least one other team operated by the other players as a candidate for an additional character to be added to at least one predetermined team. The control unit 112 also controls the communication unit so as to receive and transmit various items of information with the plurality of terminal devices included in the terminal device 30. In addition, the control unit 112 controls the storage unit 111 and/or the HDD 116 to read and/or update user information and the like in the storage unit 111 and/or the HDD 116. The control unit 112 may comprise a single CPU or a plurality of CPUs.

The HDD 116 exchanges various information with other components through the I/F circuit 114. The HDD 116 stores, for example, the item arrangement information and item capture cost information required by the application executed by the terminal device, the user information of the first application, and the user information of the second application, and reads this information on demand on the basis of a command from the control unit 112.

Although the storage unit 111 including a RAM, a ROM, a nonvolatile memory, and the like has been described as separate from the HDD 116 in the present embodiment, the storage unit may include the HDD 116.

The communication processor 117 executes processing such as modulating or demodulating information for transmitting or receiving information between terminal devices and other server devices (not shown) through the antenna 118.

The communication processor 117 executes processing on the basis of a broadband wireless communication system such as typically wideband-code division multiple access (W-CDMA), or on the basis of a narrow-band wireless communication system such as a wireless LAN or Bluetooth (registered trademark), such as typically IEEE802.11. The communication processor 117 is connected to the antenna 118 capable of wireless communication with the outside, but need not use wireless communication, and may be connected so as to be capable of wireless communication with the outside through a wired cable. The communication processor 117 may on occasion form a communication unit with the antenna 118.

3. Configuration of Terminal Device 30

Figure 2:
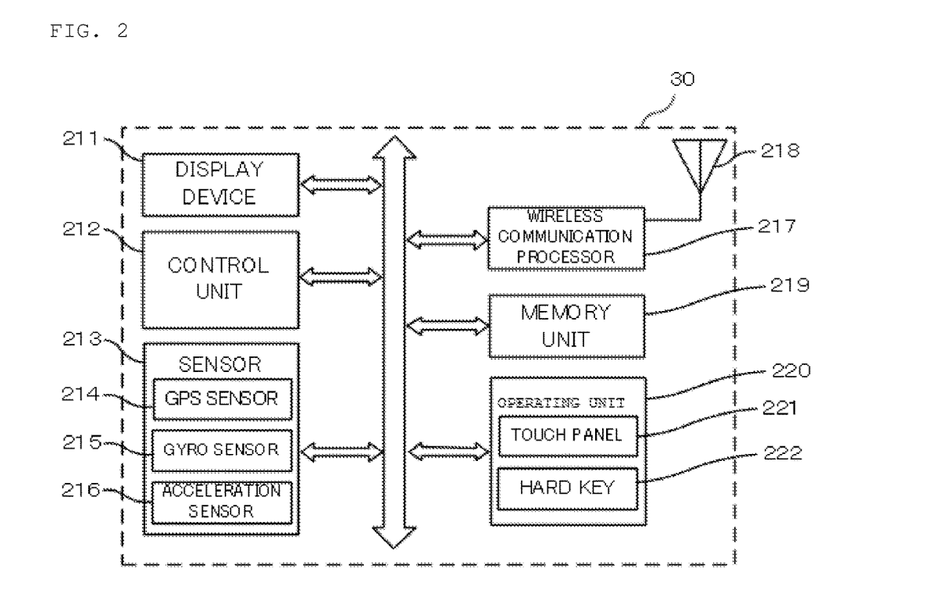
FIG. 2 is a Block diagram showing an example of the configuration of a terminal device 30 according to an embodiment of the present invention.

FIG. 2 is a block diagram showing an example of the configuration of the terminal device 30 according to an embodiment of the present invention. The terminal device 30 need not be provided with all of the components shown in FIG. 2, and may comprise a configuration omitting some of these components or having other additional components.

An example of the terminal device 30 is a portable terminal device capable of wireless communication, as typified by a smartphone, but any device that can be carried may be suitably applied to the present invention besides this, such as a portable game machine, a feature phone, portable information terminal, a PDA, or a laptop PC. Even a terminal device that is inconvenient to carry, such as a desktop PC, may be used as the terminal device 30.

According to FIG. 2, the terminal device 30 comprises a display device 211, a control unit 212, sensors 213 including a GPS sensor 214, a gyro sensor 215, and an acceleration sensor 216, a communication unit comprising a wireless communication processor 217 and an antenna 218, a memory unit 219 including a RAM, a ROM, and a nonvolatile memory (in some cases a HDD), and an operating unit 220 comprising a touch panel 221 and a hard key 222. These components are electrically interconnected through control lines and data lines.

The display device 211 reads and variously displays image information stored in the memory unit 219 according to commands of the control unit 212. The display device 211 comprises, for example, a liquid crystal display.

The operating unit 220 comprises a touch panel 221, a hard key 222, and the like, and receives various types of commands and inputs from the user. The touch panel 221 is arranged so as to cover the display device 211, and outputs to the control unit 212 position coordinate information corresponding to the image data displayed by the display device 211. The touch panel may be of a conventional variety such as a resistive membrane touch panel, an electrostatic capacitance coupling touch panel, or an ultrasonic surface acoustic wave touch panel. In the present embodiment, the touch panel 221 detects swipe and tab operations using an indicator for various items displayed by the display device 211.

The control unit 212 comprises a central processing unit (CPU), and controls other connected components on the basis of various programs stored in the memory unit 219. Specifically, the control unit 212 reads and executes a program for executing the first application and the second application from the memory unit 219. The control unit 212 also generates various types of operating information on the basis of outputs from the touch panel 221. The control unit 212 may comprise a single CPU, or a plurality of CPUs. A GPU specialized in image processing may also be provided.

The memory unit 219 comprises a ROM, a RAM, a nonvolatile memory, and the like. The ROM stores programs for executing the first application and the second application. The RAM is a memory used for writing and reading data while the control unit 212 processes various commands generated by execution of a program stored in the ROM. The nonvolatile memory is a memory for storing data written and read by executing the programs, and preserves the data written there until execution of the program has ended.

The wireless communication processor 217 exercises processing such as modulating or demodulating for transmitting or receiving information through the connected antenna 218 between the server device 10 and other terminal devices installed remotely. For example, the wireless communication processor 217 exercises processing for receiving programs for executing the first application and the second application, user information used in these applications, and the like from the server device 10 according to the progress of the application. The processor also exercises processing for transmitting the results of processing the application to the server device 10.

The wireless communication processor 217 exercises processing on the basis of a broadband wireless communication system such as typically wideband-code division multiple access (W-CDMA), but may also execute processing on the basis of narrow-band wireless communication such as a wireless LAN or Bluetooth (registered trademark), such as typically IEEE802.11.

The wireless communication processor 217 and the antenna 218 comprise a communication unit. Wire communication may be used instead of or in addition to wireless communication. In this case, a communication processor for wire communication may be provided instead of or in addition to the wireless communication processor 217.

4. Functions of Server Device 10

Figure 3:
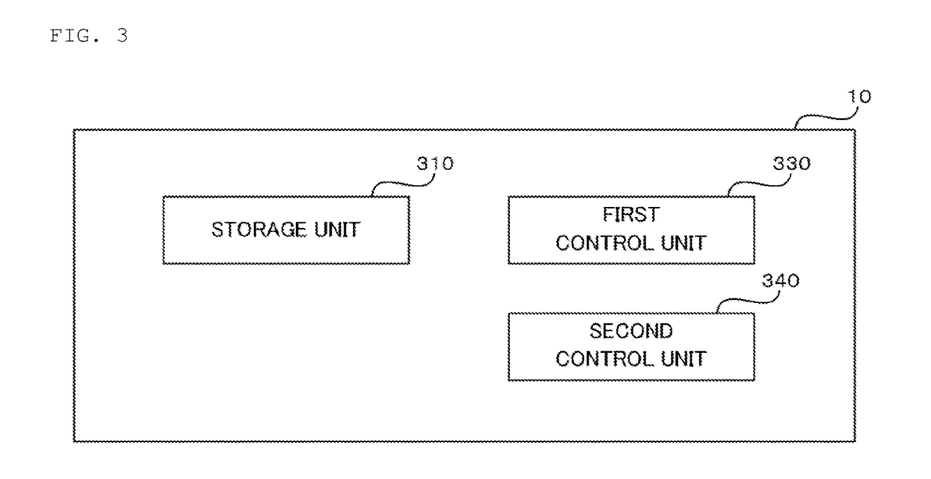
FIG. 3 is a Block diagram showing the functions of the server device 10 according to an embodiment of the present invention.

Next, the functions of the server device 10 realized by the components shown in FIG. 1B will be described with reference to FIG. 3. FIG. 3 is a block diagram showing the functions of the server device 10 according to an embodiment of the present invention. As shown in FIG. 3, the server device 10 comprises mainly a storage unit 310, a first control unit (location information processor) 330, and a second control unit (game playing unit) 340.

The storage unit 310 stores the location information of each player, and information on at least one team operated by players and made up of a plurality of characters. The information stored by the storage unit 310 will be described hereinafter.

The first control unit 330 generates information on other players located within a predetermined distance from the location of each player on the basis of the location information acquired from each player, and sends this information to the terminal devices corresponding to each player. The second control unit 340 mainly exercises control pertaining to playing a game by a team operated by a player against an opponent character. The second control unit 340 transmits information on a specified character selected from among a plurality of characters comprising at least one team operated by another player located within a predetermined distance from the location of this player to the terminal device 30 as a candidate for an additional character to be added to the team operated by each player (for example, as information on a helper). The second control unit 340 also adds information on the specified character selected by a player from among the specified characters displayed in this way (for example, as information on a helper) to the information on the team of this player.

The functions of the first control unit 330 and the second control unit 340 need not be separate, but may be realized together as a single function.

5. Configuration of Terminal Device 30

Figure 4:
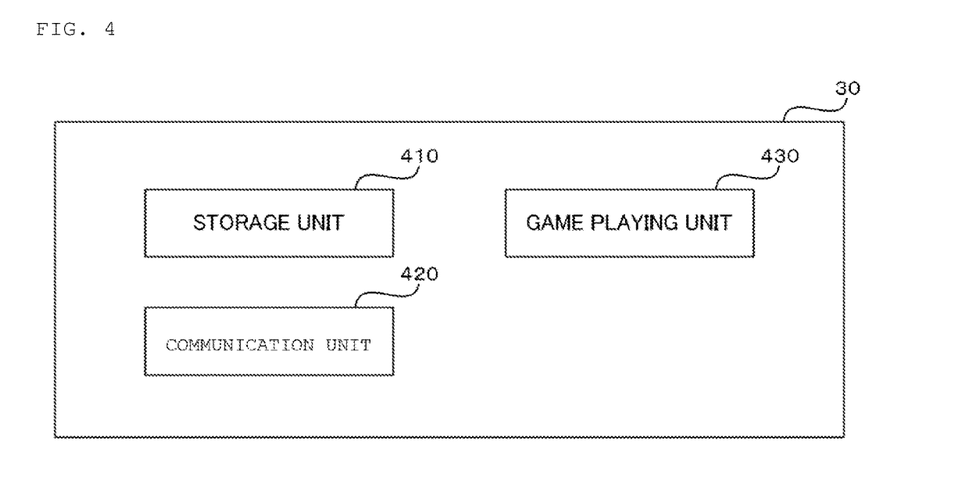
FIG. 4 is a Block diagram showing the functions of the terminal device 30 according to an embodiment of the present invention.

Next, the functions of the terminal device 30 realized by the components shown in FIG. 2 will be described with reference to FIG. 4. FIG. 4 is a block diagram showing the functions of the terminal device 30 according to an embodiment of the present invention. As shown in FIG. 4, the terminal device 30 includes mainly a storage unit 410, a communication unit 420, and a game playing unit 430.

The storage unit 410 stores information on at least one team operated by a local player and made up of a plurality of characters. The communication unit 420 transmits the location information of local player to the server device 10, and receives information on other players located within a predetermined distance from the location of local player from the server device 10. The game playing unit 430 executes processing pertaining to a game by the team operated by a local player against an opponent character. The game playing unit 430 is capable of displaying specified characters selected from among a plurality of characters comprising teams operated by other players located within a predetermined distance from the location of local player as a candidate for an additional character to be added to local team (for example, as a helper). The game playing unit 430 also adds a specified character selected by a local player from among the specified characters displayed in this way to local team (for example, as a helper).

6. Execution of "Service Providing Information on Other Players"

Next, how the terminal device 30 provides a "service providing information on other players" to a user will be described by citing a specific example.

Figure 5:
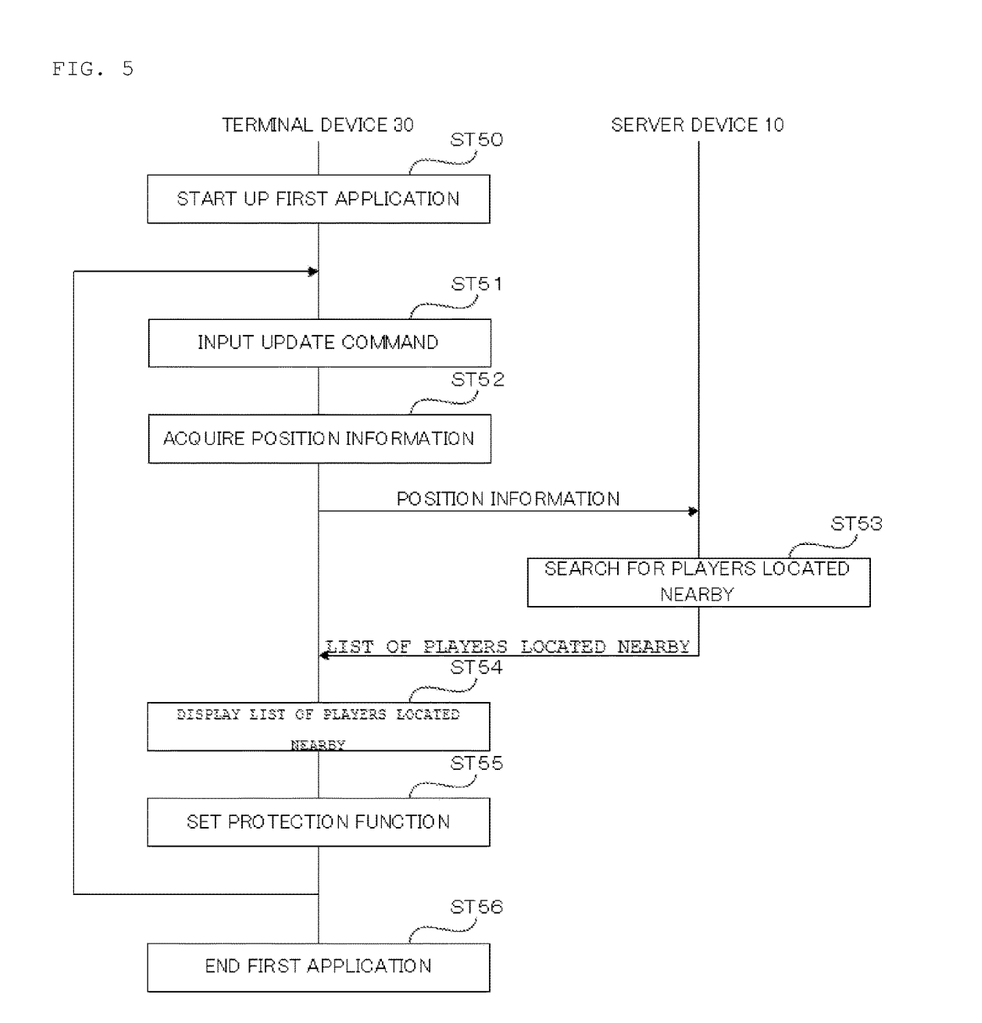
FIG. 5 is a Flow chart showing the operations performed between the terminal device 30 and the server device 10 in the case that a "service providing information on other players" is provided in a game system according to an embodiment of the present invention.

FIG. 5 is a flow chart showing the operations performed between the terminal device 30 and the server device 10 in the case that a "service providing information on other players" is provided in a game system according to an embodiment of the present invention.

First, in step (hereafter called "ST") 50, the player operates the terminal device 30 to start up the first application. Upon the first application starting up, the display device of the terminal device 30 displays the screen shown in FIG. 6. At this time, the terminal device 30 has not transmitted location information to the server device 10, and therefore, the screen shown in FIG. 6 does not show information on other players located within a predetermined distance from the location of the player.

Figure 6:
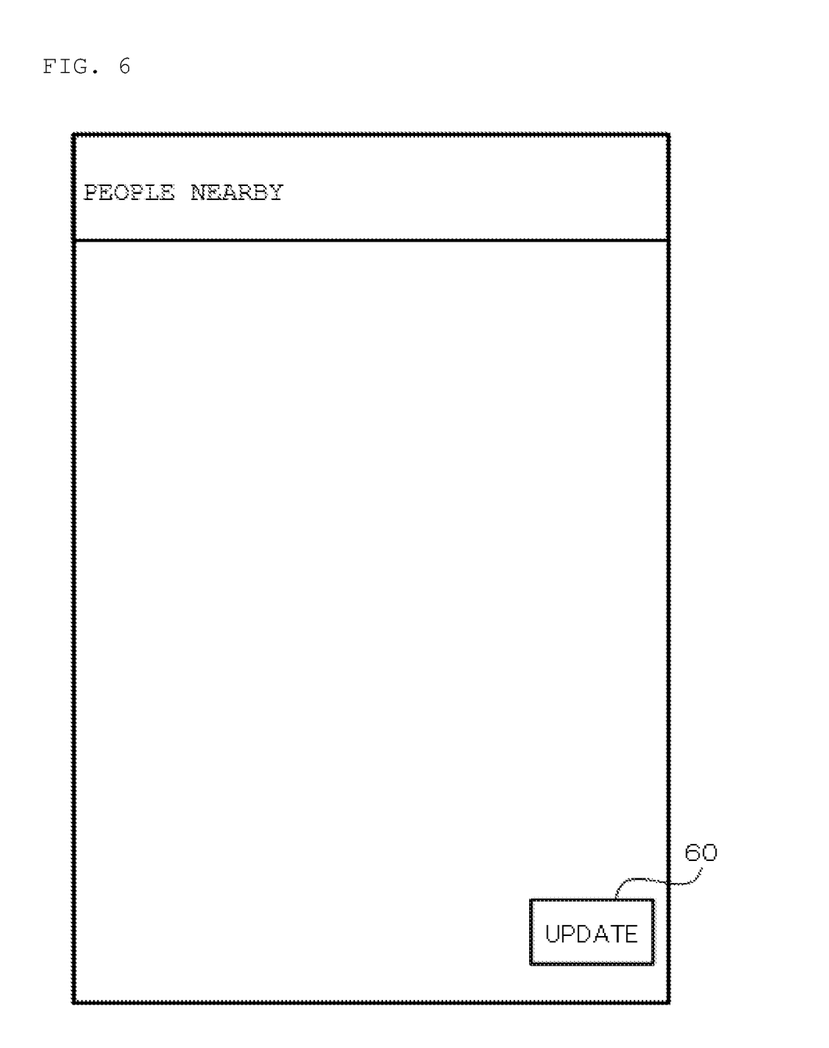
FIG. 6 is a Block diagram showing an example of the content displayed on a display device of the terminal device 30 in a game system according to an embodiment of the present invention.

In ST51, the player inputs an update command by clicking the icon 60 labeled "Update" displayed on the screen. Upon this, in ST52, a GPS receiver 36 in terminal device 30 receives location information indicating the current location of terminal device 30 from a GPS satellite. The terminal device 30 transmits the location information received in this way (for example, by the wireless communication processor 217 and the antenna 218) to the server device 10 through the communication unit 420.

In ST53, the first control unit (location information processor) 330 (realized, for example, by the control unit 112 or the like) of the server device 10 searches for other players located within a predetermined distance from the location of the player (the terminal device 30). An example of the processing executed in the first control unit 330 will be described with reference to Table 1.

TABLE 1

| Player ID | Date and time of registration | Latitude | Longitude | Other players located within a predetermined distance | Players to be protected |
|---|---|---|---|---|---|
| A10001 | 2016/01/01/15:15 | X001 | Y001 | X12356, Y22313, Q23521, R11121, . . . , Z99212 | Y22313 |
| A10002 | 2016/01/30/12:25 | X002 | Y002 | P53233, T43444, L12123, P33221, . . . , E33323 | L12123, E33323 |
| A10003 | 2016/01/15/23:55 | X003 | Y003 | Q43532, I99323, N43123, O33222, . . . , W99887 | I99323, N43123 |
| . . . | . . . | . . . | . . . | . . . | . . . |
| Z9999 | 2016/01/18/15:53 | X999 | Y999 | 632183, U22212, C32194, 433333, . . . , B12122 | R33333 |

The first control unit 330 stores the date and time of registration, the latitude and longitude, and information on other players located within a predetermined distance in the storage unit 310 correlated, for example, with player ID identifying each player. For example, to take the example of a player identified by the player ID of "A10001," after receiving location information (latitude X001 and longitude Y001) from this player, the first control unit 330 stores the time of this information as "Jan. 1, 2016, 15:15." The first control unit 330 then compares this location information with stored location information corresponding to other players, and searches for other players located within a predetermined distance for example, 10 km, 20 km, or 30 km) from the location of this player. The player ID of these other searched players are stored as "X12356," "Y22313," "Q23521," "R11121," . . . , "Z99212."

In a first embodiment, for each player, the first control unit 330 can store only a predetermined number of players (for example, five) as other players located within a predetermined distance from the location of this player. The predetermined number of players may be randomly selected from among a plurality of players located within a predetermined distance from the location of this player. Instead of this, the predetermined number of players may be the five players having the most recently stored date and time of registration from among a plurality of players located within a predetermined distance from the location of this player.

Next, returning to FIG. 5, in ST53, the server device 10 transmits a list of players located nearby (the player ID of players located nearby) (and information on these players) to the terminal device 30.

Figure 7:
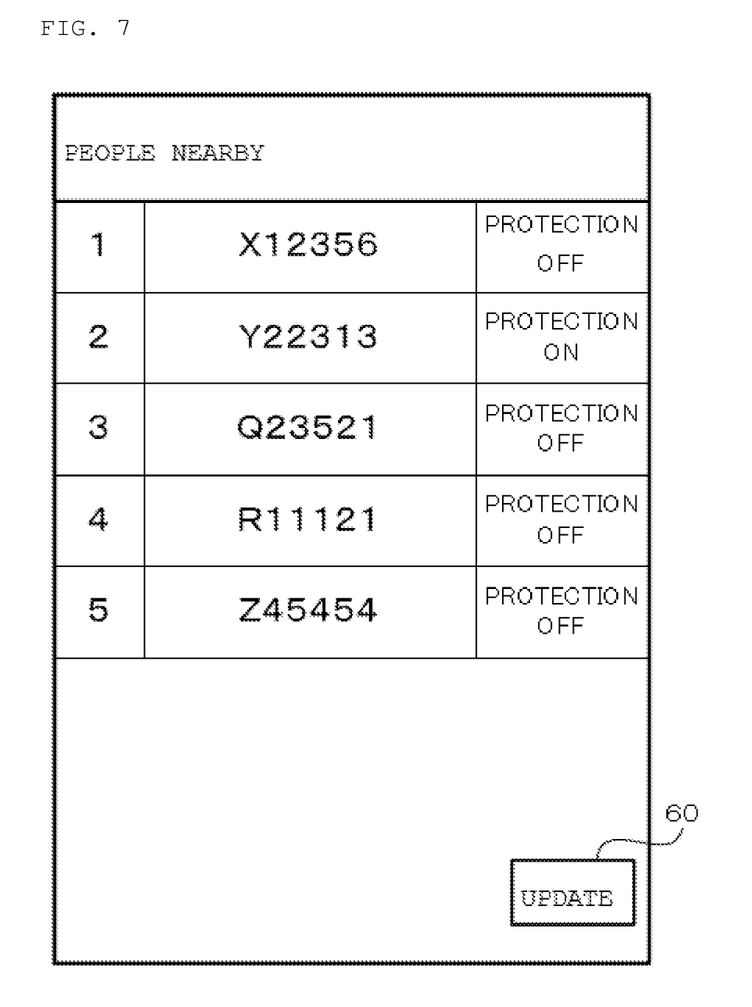
FIG. 7 is a Block diagram showing an example of the content displayed on a display device of the terminal device 30 in a game system according to an embodiment of the present invention.

In ST54, the terminal device 30 stores the list of players located nearby (the player ID of the players) received in this way in the storage unit 410. The terminal device 30 also displays the existence of these players, for example, on a display device as shown in FIG. 7. For simplicity, FIG. 7 shows the ID of the players located nearby, but may display the names (such as the user names) corresponding to these ID instead of the ID of the players.

The player may subsequently update such a list of players located nearby at any time (or, instead of this, at an arbitrary time after a predetermined time has elapsed from when the most recent update command was inputted). In this case, when the player, returning to ST51, again inputs an update command by clicking the update button 60, the same processing as described earlier is executed in ST52-ST54 to display an updated list (created by updating the information shown in Table 1) on the screen of the terminal device 30. At this time, as described earlier, a predetermined number (for example, five) of players is randomly selected from among a plurality of players located within a predetermined distance from the location of the player as described earlier. As a result, players who were on the list obtained by inputting the previous update command may be erased from the list obtained by inputting the new update command.

If the player does not wish to erase a specified player from the list, as shown in FIG. 7, the player may click this specified player (for example, the player identified by the player ID of "Y22313") (setting "protection ON") to protect this specified player from being erased from the list. The information on such protection is transmitted by the terminal device 30 to the server device 10, and the first control unit 330 in the server device 10 turns the information on protection corresponding to the specified player to ON (adds "Y22313" in the example of "Players to be protected" in Table 1). Therefore, if new location information is received for player "A10001," for example, the first control unit 130 always leaves player "Y22313" among the plurality of players located within a predetermined distance. As a result, player "A10001" can continuously leave player "Y22313" among the players on the list of players located nearby on the display device of the terminal device 30.

In one embodiment, in the case that protection "ON" has been set for a given specified player, the protection "ON" set for this specified player may be set to protection "OFF" after a predetermined time limit (for example, 24 hours) has elapsed since the time when protection "ON" was set. As a device for realizing this feature, for example, the first control unit 330 stores the date and time that protection "ON" was set for each specified player for whom protection "ON" was set (the setting date and time) in storage unit 310 in advance, calculates the time elapsed from the difference between the current date and time and the setting date and time at a predetermined cycle for each specified player for whom protection "ON" was set in this way, and decides whether to cancel the protection "ON" by comparing this elapsed time with a predetermined time limit.

Other players who provide a character as a helper to the local team of a local player from the list generated for local player as described earlier in the "multiplayer game service" (described later) may be erased from this list promptly when the next update command is inputted or after a predetermined time has elapsed.

Next, returning to FIG. 5, in ST56, the player operates the terminal device 30 to end the first application.

7. Execution of "Multiplayer Game Service"

Next, how the terminal device 30 offers a "multiplayer game service" to the user will be described by citing a specific example.

Figure 8:
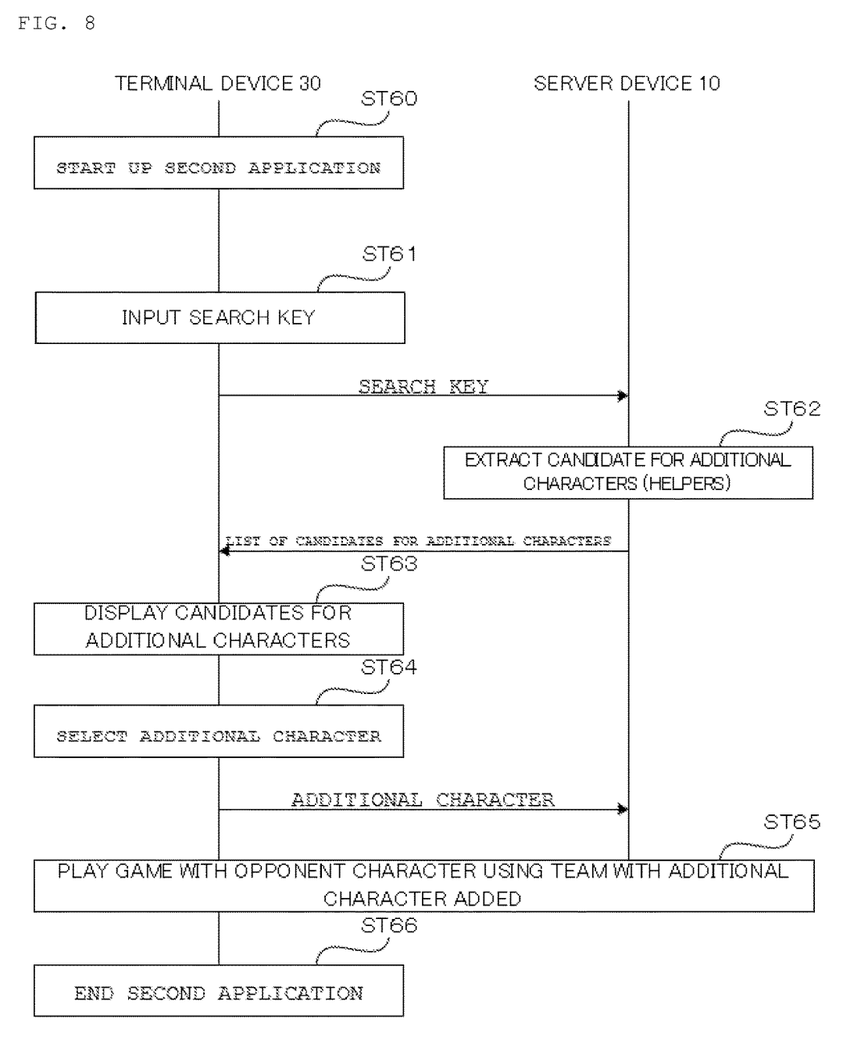
FIG. 8 is a Flow chart showing the operations performed between the terminal device 30 and the server device 10 in the case that a "multiplayer game service" is provided in a game system according to an embodiment of the present invention.

FIG. 8 is a flow chart showing the operation performed between the terminal device 30 and the server device 10 in the case that a "multiplayer game service" is provided in a game system according to an embodiment of the present invention.

In ST60, the player operates the terminal device 30 to start up the second application.

In this second application, the player leads, for example, any team selected from among at least one team operated by the player and made up of a plurality of characters to play a game with an opponent character. During this game, any character from among a plurality of characters operated by a plurality of players located within a predetermined distance from the location of this player may be added (for example, as a helper) to the team so selected. The "plurality of players located within a predetermined distance" here are the players recognized through the "service providing information on other players" described earlier (for example, the players listed on the list of "people nearby" in FIG. 7).

How a character of another player is added to local team (as a helper) is indicated by the following ST61-ST64.

Figure 9:
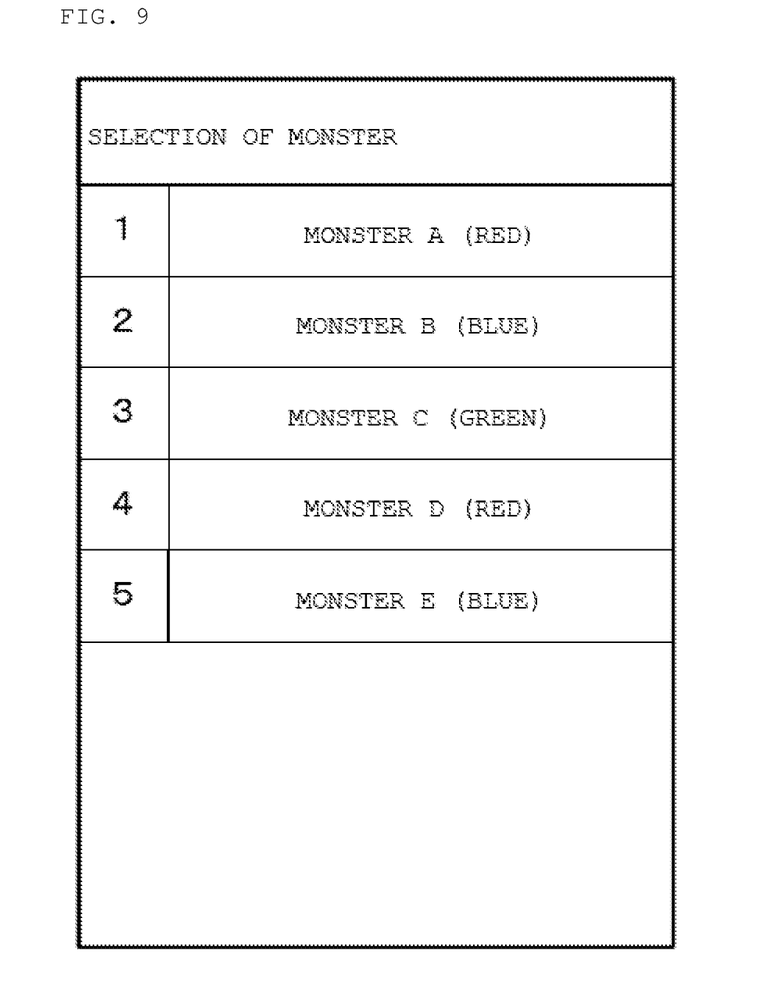
FIG. 9 is a Block diagram showing an example of the content displayed on a display device of the terminal device 30 in a game system according to an embodiment of the present invention.

Specifically, first, the player inputs a search key in ST61. In the present embodiment, as an example, the player decides to set any leader character (leader monster) selected from among the leader characters (leader monsters) of at least one team operated by the player as the search key. For example, since the leader characters of each team operated by this player (for example, the five leader characters of monster A (red), monster B (blue), monster C (green), monster D (red), and monster E (blue) in FIG. 9) are displayed on the display device of the terminal device 30 as shown in FIG. 9, the player may decide to set any one from among these leader characters as the search key.

The communication unit 420 of the terminal device 30 transmits the search key decided by the player to the server device 10.

In ST62, a second processor (game playing unit) 340 in the server device 10 (realized, for example, by the control unit 112) uses the search key transmitted by the player to search the information stored in the storage unit 310 and thereby extract candidates for additional characters to be added (as a helper) to the team selected by this player.

A specific example of the information stored by the storage unit 310 for extracting candidates for such an additional character will be described with reference to the following Tables 2-4.

TABLE 2

| Player ID | Team ID |
|---|---|
| A10001 | TM00001, TM00002, TM00003, . . . , TM00006 |
| A10002 | TM0010,. TM03102, TM04103, . . . , TM10109, TM10111 |
| A10003 | TM31001, TM41011 |
| . . . | . . . |
| Z9999 | TM81011, TM98233, . . . , TM99315 |

As shown in Table 2, the storage unit 310 stores, for example, a team ID identifying each team operated by this player (each team comprises a plurality of characters) correlated with a player ID identifying each player. Such information may be used to specify which team each player has.

TABLE 3

| Team ID | Character ID | Leader ID |
|---|---|---|
| TM00001 | CH00001, CH00002, . . . , CH00005 | CH00002 |
| TM00002 | CH01001, CH01002, . . . , CH01005 | CH01005 |
| TM00003 | CH01222, CH01223, . . . , CH01236 | |
| . . . | . . . | . . . |
| TM99998 | CH89721, CH89722, . . . , CH89733 | CH89723 |
| TM99999 | CH91012, CH92001, . . . , CH93210 | CH92009 |

As shown in Table 3, the storage unit 310 stores, for example, a character ID identifying each of the plurality of characters comprising each team correlated with the team ID identifying that team, and a leader ID indicating which character from among this plurality of characters is the leader character. Such information may be used to specify which characters comprise each team, and which character from among these characters is the leader character for that team.

TABLE 4

| Character ID | Monster ID | Attribute ID | Name of character |
| --- | --- | --- | --- |
| CH00001 | MS001 | PR001 | Mr/Ms X |
| CH00002 | MS001 | PR001 | Mr/Ms Y |
| CH00003 | MS999 | PR005 | Mr/Ms Z |
| ... | ... | ... | ... |
| CH99998 | MS015 | PR981 | Mr/Ms Q |
| CH99999 | MS015 | PR115 | Mr/Ms R |

As shown in Table 4, the storage unit 310 stores, for example, monster ID identifying which monster each character is, attribute ID identifying which attribute each character has (for example, red, green, blue, and yellow), and a character name which is the name assigned to each character, correlated with the character ID identifying that character. Such information may be used to specify which monster each character is, and which attribute each character has.

Returning to FIG. 8, in ST62, the second control unit 340 first specifies which players are the other players located within a predetermined distance from the location of the player is question, using, for example, the information shown in Table 1. Next, the second control unit 340 specifies which leader character each of the teams operated by these other players (or more preferably, the team used most recently in a "multiplayer game service" or the team listed first (that is, team 1) from among the plurality of teams operated by these other players) has, using, for example, the information shown in Tables 2 and 3. The second control unit 340 then specifies what type of monster each leader character specified in this way is and what attributes the monster has, using, for example, the information shown in Tables 3 and 4. Thereupon, the second control unit 340 determines the leader characters who share at least one of monster type or attribute with the leader character of the player in question (the leader characters selected by the player in question as the search key in ST61) from among the plurality of leader monsters specified in this way as candidates for additional characters. Finally, the second control unit 340 transmits character ID identifying the characters included among these candidates (and information on these ID) to the terminal device 30 as a "list of candidates for additional characters."

Figure 10:
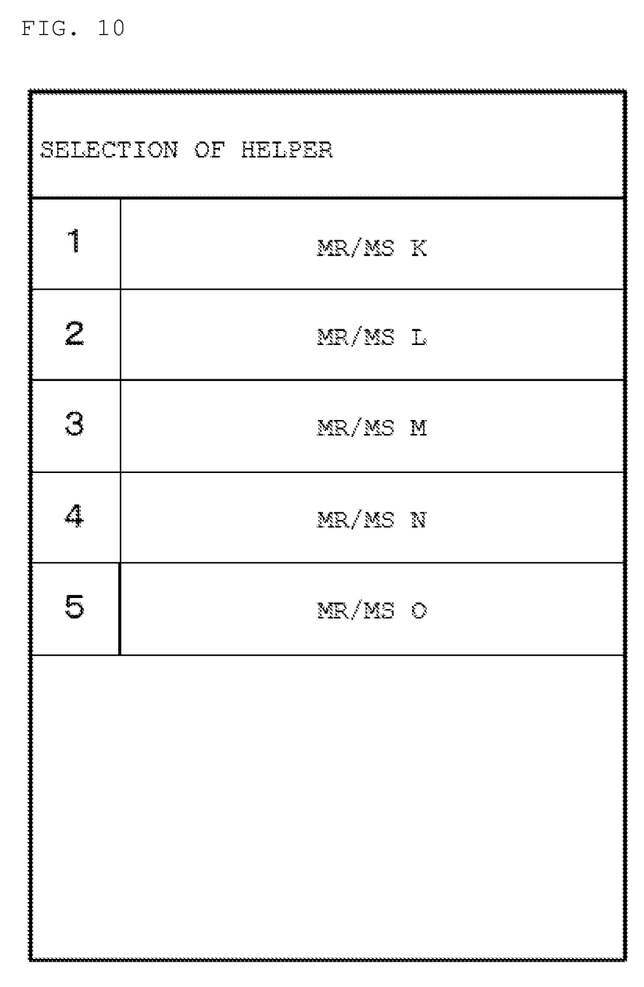
FIG. 10 is a Block diagram showing an example of the content displayed on a display device of the terminal device 30 in a game system according to an embodiment of the present invention.

In ST63, the game playing unit 430 (realized, for example, by the control unit 212) in the terminal device 30 displays the list of candidates for additional characters received from the server device 10 the display device of the terminal device 30 as shown in FIG. 10.

In ST64, the player clicks to select a desired additional character from among the candidates for additional characters shown on the display device of the terminal device 30. As a result, the communication unit 420 of the terminal device 30 transmits the character ID identifying this selected additional character to the server device 10.

In ST65, the second control unit (game playing unit) 340 of the server device 10 and the game playing unit 430 of the terminal device 30 collaborate to allow the new team obtained by adding the additional character selected by the player (in ST64) to the team selected by the payer (in ST60) to play a game with an opponent character. Such a multiplayer game has been disclosed, for example, by Japanese Unexamined Patent Publication No. 5755785 (hereinafter "Patent Document 2") and is common knowledge, and therefore will not be described in detail. The entire contents of Patent Document 2 are hereby incorporated herein by reference.

Next, in ST66, the player operates the terminal device 30 to end the second application.

Thus, with the game system according to the present embodiment, during a multiplayer game against an opponent character by local team operated by a local player and made up of a plurality of characters, a multiplayer game service is provided in which an additional character to be added to local player as a helper is selected from among characters included in other teams operated by other players located within a predetermined distance from the location of local player, and a game is played against an opponent character by local team with the selected additional character added. As a result, each player is provided with a helper by a known player according to the current location of the player, and can find new enjoyment, not available previously, by playing a game against an opponent character by a team including this helper.

Making the character added to local team as a helper a character who shares at least one of monster type or attribute with the leader character of local team increases the total number of characters in local team who share at least one of monster type or attribute. As a result, each player can more usefully and effectively play a multiplayer game by local team against an opponent character.

Although a list of other players located within a predetermined distance from the location of local player (FIG. 5, ST53), a list of candidates for an additional character to be added as a helper to local team of local player (FIG. 8, ST62), and the like were described as being generated in the server device 10 in the foregoing embodiments, these lists may also be generated in the terminal device 30 using the same processing as in the server device 10.

In the foregoing embodiments, the plurality of other players located within a predetermined distance were displayed by a list of "people nearby" (FIG. 7). During this display, the user can select whether to receive a character provided as a helper from a player in question, and the display during the selection of a helper shown in FIG. 10 may be limited to only the players selected as described earlier. The time during which a helper can be selected may also be limited, and the list of helper candidates shown in FIG. 10 as a helper may be displayed only during this time.

Although using a leader character from among a plurality of characters comprising other teams of other players as an additional character to be added to local team of local player was described in the foregoing embodiments, a character selected from among a plurality of characters comprising other teams of other players according to various factors, including the attribute, type of monster, rank, or level, may be used as the additional character.

Besides as explicitly described by the embodiments, the processing and procedures described in the present description may be realized by software, hardware, or a combination of these. Specifically, the processing and procedures described in the present description are realized by loading a logic element corresponding to the processing in a medium such as an integrated circuit, a volatile memory, a nonvolatile memory, a magnetic disk, or an optical storage. The processing and procedures described in the present description may also be executed by various types of computers in which these processing and procedures have been loaded as a computer program.

Although the processing and procedures described in the present description were described as being executed by a single device, software, component, or module, such processing and procedures may be executed by a plurality of devices, a plurality of software, a plurality of components, and/or a plurality of modules. Although the data and tables or databases described in the present description were described as loaded in a single memory, such data and tables or databases may be loaded by distributing between a plurality of memories provided in a single device or a plurality of memories arranged distributed among a plurality of devices. The software and hardware elements described in the present description may be realized by integrating these into fewer components, or breaking these up into more components.

What is claimed is:

1. A server device comprising:
   a communication device through which the server device is configured to be communicably connected to terminal devices including first and second terminal devices;
   a memory configured to store computer-readable instructions and information relating to a first team operated by a first player corresponding to the first terminal device, the first team being configured by a plurality of first characters;
   a processor configured to execute the computer-readable instructions so as to:
      determine the terminal devices that are located within a predetermined distance from the first terminal device, each of the terminal devices corresponding to at least one character operated by each of players of the terminal devices;
      send information relating to the characters corresponding to the terminal devices located within the predetermined distance from the first terminal device to the first terminal device via the communication device;
      receive information relating to a specified character corresponding to the second terminal device from the first terminal device via the communication device, the specified character being selected by the first player among the characters of the terminal devices located within the predetermined distance from the first terminal device;
      send information relating to the specified character to the first terminal device so as to add the specified character into the plurality of first characters playing against an opponent character; and
      determine whether a predetermined time is reached with respect to the specified character,
   wherein even when the processor determines that the second terminal device is located beyond the predetermined distance from the first terminal device, the processor is configured to send the information relating to the specified character to the first terminal device via the communication device until the predetermined time is reached.

2. The server device according to claim 1,
   wherein when the processor sends the specified character to the first terminal device, the processor is configured to prohibit the terminal devices from receiving the specified character via the communication device.

3. The server device according to claim 1,
   wherein the processor is configured to send information relating to a leader character among the characters corresponding to the terminal devices located within the predetermined distance from the first terminal device to the first terminal device via the communication device.

4. The server device according to claim 3,
   wherein the processor is configured to send information relating to candidate characters that have a same attribute as the leader character among the characters corresponding to the terminal devices located within the predetermined distance from the first terminal device to the first terminal device via the communication device.

5. The server device according to claim 1,
   wherein the processor is configured to determine the terminal devices that are located within the predetermined distance from the first terminal device, and the determined terminal devices correspond to the characters operated by the players, and
   the processor is configured to send information relating to the players to the first terminal device via the communication device, and a number of the players sent by the processor is a predetermined number.

6. The server device according to claim 1,
   wherein the processor is configured to cause the first terminal device to display information relating to a second player of the second terminal device.

7. A terminal device comprising:
   a memory configured to store computer-readable instructions and information relating to a first team operated by a first player corresponding to the terminal device, the first team being configured by a plurality of first characters;
   a receiver for receiving, via a communication line, information relating to other terminal devices located within a predetermined distance from the terminal device, each of the other terminal devices corresponding to at least one character operated by each of players of the other terminal devices; and
   a processor configured to execute the computer-readable instructions so as to:
      cause the receiver to receive the information relating to the characters corresponding to the other terminal devices located within the predetermined distance from the terminal device via the communication line;
      control a game played by the first team against an opponent character;
      send information relating to a specified character among the characters of the other terminal devices located within the predetermined distance from the terminal device via the communication line, the specified character corresponding to another terminal device among the other terminal devices, the specified character being selected by the first player;
      cause the receiver to receive information relating to the specified character via the communication line so as to add the specified character into the plurality of first characters playing against the opponent character; and
      determine whether a predetermined time is reached with respect to the specified character; and
   a display configured to display the specified character in addition to the plurality of first characters,
   wherein even when the another terminal device is located beyond the predetermined distance from the terminal device, the processor is configured to cause the receiver to receive the information relating to the specified character via the communication line until the predetermined time is reached.

8. A method for causing a processor to execute a process, the method comprising executing on the processor the steps of:

storing information relating to a first team operated by a first player corresponding to a first terminal device, the first team being configured by a plurality of first characters;

determining other terminal devices that are located within a predetermined distance from the first terminal device, each of the other terminal devices corresponding to at least one character operated by each of players of the other terminal devices;

transmitting information relating to the characters corresponding to the other terminal devices located within the predetermined distance from the first terminal device to the first terminal device via a communication line;

controlling a game played by the first team against an opponent character;

receiving information relating to a specified character among the characters of the other terminal devices located within the predetermined distance from the first terminal device via the communication line, the specified character corresponding to a second terminal device among the other terminal devices, the specified character being selected by the first player;

sending information relating to the specified character to the first terminal device so as to add the specified character into the plurality of first characters playing against the opponent character; and determining whether a predetermined time is reached with respect to the specified character;

wherein even when the second terminal device is located beyond the predetermined distance from the first terminal device, the information relating to the specified character is transmitted to the first terminal device via the communication line until the predetermined time is reached.

9. A computer program product embodying computer-readable instructions on a non-transitory computer-readable medium for causing a computer to execute the computer-readable instructions by a processor so as to perform the steps of:

storing information relating to a first team operated by a first player corresponding to a first terminal device, the first team being configured by a plurality of first characters;

determining other terminal devices that are located within a predetermined distance from the first terminal device, each of the other terminal devices corresponding to at least one character operated by each of players of the other terminal devices;

transmitting information relating to the characters corresponding to the other terminal devices located within the predetermined distance from the first terminal device to the first terminal device via a communication line;

controlling a game played by the first team against an opponent character;

receiving information relating to a specified character among the characters of the other terminal devices located within the predetermined distance from the first terminal device via the communication line, the specified character corresponding to a second terminal device among the other terminal devices, the specified character being selected by the first player;

sending information relating to the specified character to the first terminal device so as to add the specified character into the plurality of first characters playing against the opponent character; and determining whether a predetermined time is reached with respect to the specified character, wherein even when the second terminal device is located beyond the predetermined distance from the first terminal device, the information relating to the specified character is transmitted to the first terminal device via the communication line until the predetermined time is reached.

* * * * *